(12) United States Patent
Tsubaki et al.

(10) Patent No.: US 10,343,711 B2
(45) Date of Patent: Jul. 9, 2019

(54) TUNING DEVICE OF ELECTRIC POWER STEERING APPARATUS

(71) Applicant: NSK LTD., Tokyo (JP)

(72) Inventors: Takahiro Tsubaki, Maebashi (JP); Yuzuru Hoshi, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/559,619

(22) PCT Filed: Mar. 8, 2017

(86) PCT No.: PCT/JP2017/009202
§ 371 (c)(1),
(2) Date: Sep. 19, 2017

(87) PCT Pub. No.: WO2017/154970
PCT Pub. Date: Sep. 14, 2017

(65) Prior Publication Data
US 2018/0370561 A1 Dec. 27, 2018

(30) Foreign Application Priority Data

Mar. 8, 2016 (JP) ................................ 2016-044512
Mar. 8, 2016 (JP) ................................ 2016-044514
(Continued)

(51) Int. Cl.
*B62D 5/04* (2006.01)
*B62D 6/00* (2006.01)

(52) U.S. Cl.
CPC ............ *B62D 5/0463* (2013.01); *B62D 6/00* (2013.01); *B62D 5/0409* (2013.01)

(58) Field of Classification Search
CPC ...... B62D 5/0463; B62D 5/0409; G06F 17/11
See application file for complete search history.

(56) References Cited

U.S. PATENT DOCUMENTS 6,539,128 B1   3/2003   Lee et al.
6,549,871 B1   4/2003   Mir et al.
(Continued)

FOREIGN PATENT DOCUMENTS

DE   102009045046 A1   3/2011
EP   0810143 A2        12/1997
(Continued)

OTHER PUBLICATIONS

International Search Report for PCT/JP2017/009202 dated Apr. 25, 2017.

*Primary Examiner* — Michael J Zanelli
(74) *Attorney, Agent, or Firm* — Sughrue Mion, PLLC

(57) ABSTRACT

A tuning device of an electric power steering apparatus assisting steering based on the correspondence relationship between a steering torque and a steering auxiliary command value according to the steering torque. The tuning device receives a plurality of candidate points represented by a steering torque and a candidate value of the steering auxiliary command value according to the steering torque, calculates a high order polynomial approximating the plurality of candidate points, calculates a plurality of adjustment points, the number of which is larger than the plurality of candidate points and which are represented by the steering torque and the steering auxiliary command value according to the steering torque, based on the high order polynomial, calculates a plurality of linear functions connecting two adjacent points in the plurality of adjustment points, and outputs information on the plurality of linear functions in order to adjust the correspondence relationship.

9 Claims, 14 Drawing Sheets

(30) Foreign Application Priority Data

Jun. 6, 2016  (JP) ................................. 2016-112612
Jun. 6, 2016  (JP) ................................. 2016-112614
Feb. 2, 2017  (JP) ................................. 2017-017466

(56) References Cited

U.S. PATENT DOCUMENTS

| 6,751,538 | B2* | 6/2004 | Endo ................... B62D 5/0463 |
| | | | 180/446 |
| 2010/0017064 | A1 | 1/2010 | Kojima |
| 2016/0110936 | A1* | 4/2016 | Cho ..................... G07C 5/0808 |
| | | | 701/32.8 |
| 2017/0166242 | A1* | 6/2017 | Konieczny ........... B62D 5/0457 |

FOREIGN PATENT DOCUMENTS

| JP | 2000-324336 A | 11/2000 |
| JP | 2002-087300 A | 3/2002 |
| JP | 2007-257025 A | 10/2007 |
| JP | 2008-110629 A | 5/2008 |

* cited by examiner

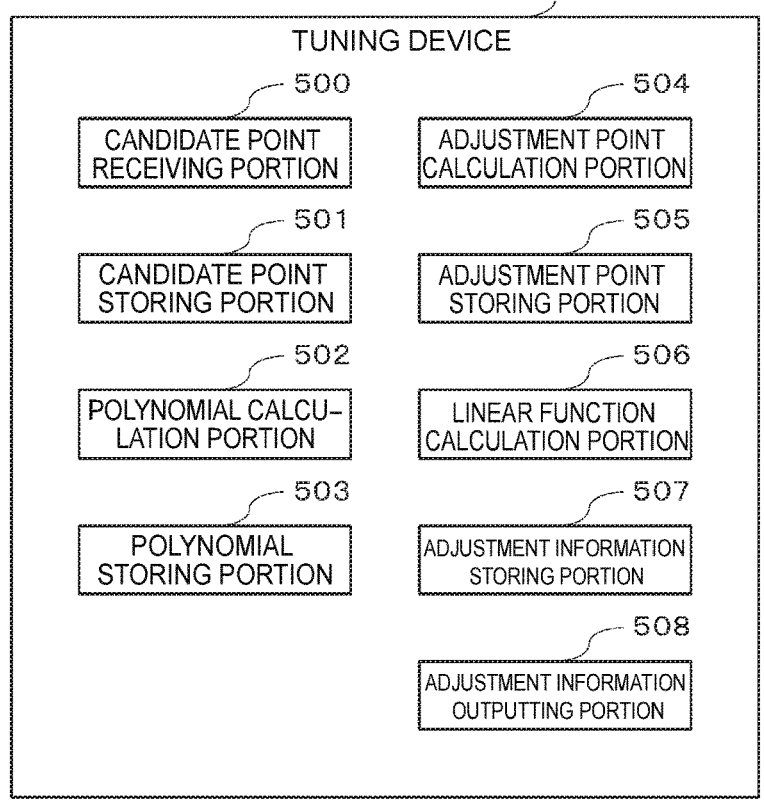
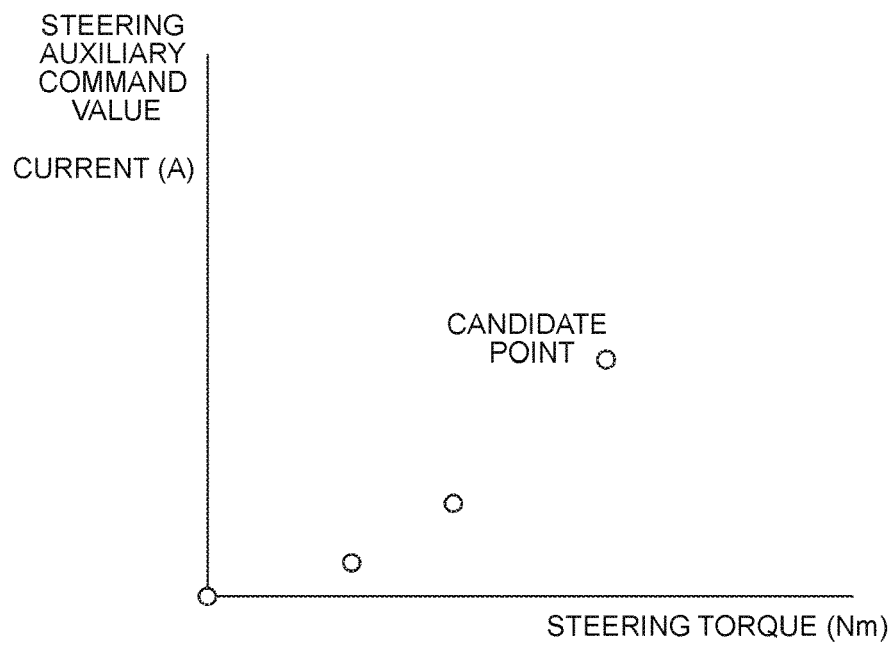

TUNING DEVICE OF ELECTRIC POWER STEERING APPARATUS

CROSS REFERENCE TO RELATED APPLICATIONS

This application is a National Stage of International Application No. PCT/JP2017/009202 filed Mar. 8, 2017, claiming priority based on Japanese Patent Application Nos. 2016-044512 filed Mar. 8, 2016, 2016-044514 filed Mar. 8, 2016, 2016-112612 filed Jun. 6, 2016, 2016-112614 filed Jun. 6, 2016 and 2017-017466 filed Feb. 2, 2017, the contents of all of which are incorporated herein by reference in their entirety.

TECHNICAL FIELD

The present invention relates to a tuning device of an electric power steering apparatus.

BACKGROUND ART

In an electric power steering apparatus for vehicles, a steering torque generated in a steering shaft by an operation of a steering handle is detected, and then the steering auxiliary command value for assisting the steering force based on the detection result is calculated (for example, Patent Document 1).

In order to enable the calculation of the steering auxiliary command value according to the steering torque, an assist map which is information showing the correspondence relationship between the torque and the steering auxiliary command value is stored in the electric power steering apparatus. In the electric power steering apparatus, the tuning of the assist map is important in order to improve steering feel.

For example, FIG. 18 and FIG. 19 are views illustrating examples of a tuning technique of the assist map. In FIG. 18 and FIG. 19, the horizontal axis represents the steering torque (Nm) and the vertical axis represents the steering auxiliary command value (current: A).

In the example illustrated in FIG. 18, a plurality of points where the steering feel is preferable (set of a steering torque and a steering auxiliary command value) are determined. Then, the space between adjacent points is interpolated by a linear function, and the parameters of the linear functions are stored as the assist map.

Also in the example illustrated in FIG. 19, a plurality of points where the steering feel is preferable are determined. Then, a high order polynomial approximating the plurality of points is derived, and the parameters of the high order polynomial are stored as the assist map.

CITATION LIST

Patent Document

Patent Document 1: Japanese Unexamined Patent Application Publication No. 10-59203

SUMMARY

Technical Problem

When interpolating the space between the adjacent points by the linear functions as illustrated in FIG. 18, it has been required to determine a large number of points in order to smoothen the changes in the steering auxiliary command value particularly in a low torque region. However, the points are manually determined, and therefore the work cost of the tuning increases.

On the other hand, as illustrated in FIG. 19, the technique using a high order polynomial has no necessity of manually determining a large number of points, so that the work cost of the tuning is reduced. However, the electric power steering apparatus requires the calculation of a high order polynomial when calculating the steering auxiliary command value, and therefore the operation processing time increases.

The present invention has been made in view of the above-described circumstances. It is an object of the present invention to reduce the work cost of the tuning of the electric power steering apparatus and reduce the operation processing time of the steering auxiliary command value.

Solution to Problem

A tuning device according to one aspect of the present invention is a tuning device of an electric power steering apparatus assisting steering based on the correspondence relationship between a steering torque and a steering auxiliary command value according to the steering torque, and the tuning device has a candidate point receiving portion receiving a plurality of candidate points represented by the steering torque and a candidate value of the steering auxiliary command value according to the steering torque, a polynomial calculation portion calculating a high order polynomial approximating the plurality of candidate points, an adjustment point calculation portion calculating a plurality of adjustment points, the number of which is larger than the plurality of candidate points and which are represented by the steering torque and the steering auxiliary command value according to the steering torque, based on the high order polynomial, a linear function calculation portion calculating a plurality of linear functions connecting two adjacent points in the plurality of adjustment points, and an adjustment information outputting portion outputting information on the plurality of linear functions in order to adjust the correspondence relationship.

In the present invention, the "portion" does not merely mean a physical means and also includes a case where a function of the "portion" is realized by software. Moreover, a function of one "portion" or device may be realized by two or more physical means or devices or functions of two or more "portions" or devices may be realized by one physical means or device.

Advantageous Effects of Invention

The present invention can reduce the work cost of tuning of an electric power steering apparatus and can reduce the arithmetic processing time of a steering auxiliary command value.

BRIEF DESCRIPTION OF DRAWINGS

FIG. 5 is a block diagram illustrating functions (first embodiment) realized in a tuning device 100A (first embodiment) which is one example of the tuning device 100.

FIG. 6 is a view illustrating one example of candidate points.

DESCRIPTION OF EMBODIMENTS

First Embodiment

Figure 1:
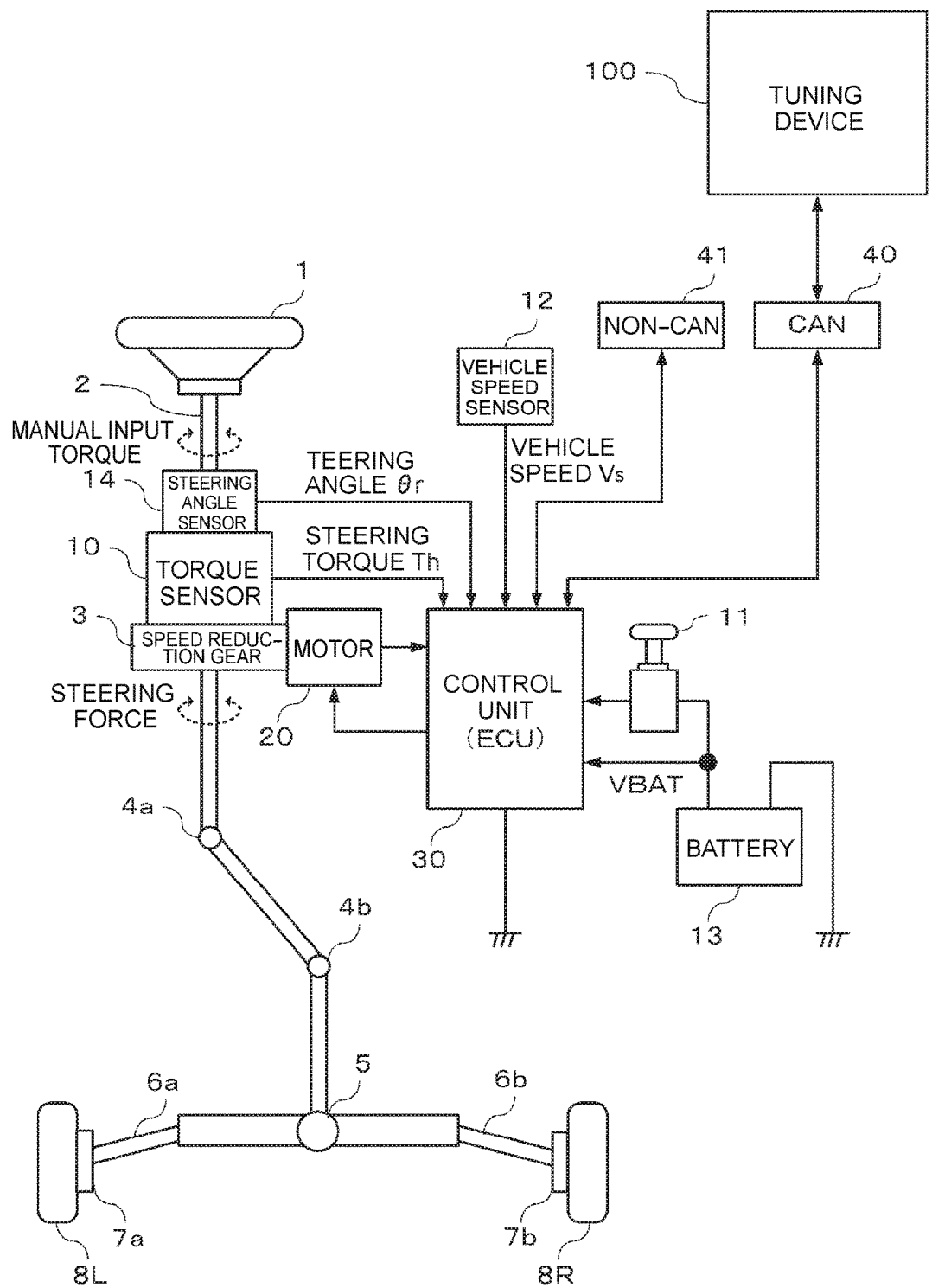
FIG. 1 is a view illustrating a general configuration of an electric power steering apparatus and the configuration of a tuning device which is one embodiment of the present invention.

First, a first embodiment of the present invention is described. FIG. 1 is a view illustrating a general configuration of an electric power steering apparatus and the configuration of a tuning device which is one embodiment of the present invention.

The electric power steering apparatus has a steering handle 1, a column shaft 2, a speed reduction gear 3, universal joints 4a and 4b, a rack and pinion mechanism 5, tie rods 6a and 6b, hub units 7a and 7b, steering wheels 8L and 8R, a torque sensor 10, an ignition key 11, a battery 13, a steering angle sensor 14, a motor 20, a control unit (ECU) 30, a CAN (Control Area Network) 40, and a non-CAN 41.

The tuning device 100 is a computer for tuning the electric power steering apparatus.

As illustrated in FIG. 1, the column shaft 2 of the steering handle 1 is connected to the steering wheels 8L and 8R through the speed reduction gear 3, the universal joints 4a and 4b, the rack and pinion mechanism 5, and the tie rods 6a and 6b and further through the hub units 7a and 7b. The column shaft 2 is provided with the steering angle sensor 14 detecting the steering angle θr of the steering handle 1 and the torque sensor 10 detecting the steering torque Th. The motor 20 assisting the steering force of the steering handle 1 is connected to the column shaft 2 through the speed reduction gear 3. To the control unit (ECU) 30 controlling the electric power steering apparatus, power is supplied from the battery 13 and an ignition key signal is input through the ignition key 11. The control unit 30 calculates a steering auxiliary command value based on the steering torque Th detected by the torque sensor 10 and a vehicle speed Vs detected by a vehicle speed sensor 12 to control the motor 20.

To the control unit 30, the CAN 40 exchanging various kinds of information is connected. The control unit 30 can communicate with the tuning device 100 through the CAN 40. Moreover, the control unit 30 can also receive vehicle information, such as the vehicle speed Vs, from the CAN 40. To the control unit 30, the non-CAN 41 which is an interface for transmitting and receiving data in a form different from the form of the CAN 40 can also be connected.

The tuning device 100 is a device for tuning the steering feel (assist map) in the electric power steering apparatus. The tuning device 100 can write a tuning result in the control unit 30 through the CAN 40, for example. The tuning device 100 does not always need to be connected to the CAN 40 and may be connected to the CAN 40 only when writing a tuning result in the control unit 30. An interface for the tuning device 100 to communicate with the control unit 30 is not limited to the CAN 40 and arbitrary interfaces, such as the non-CAN 41, are usable.

Figure 2:
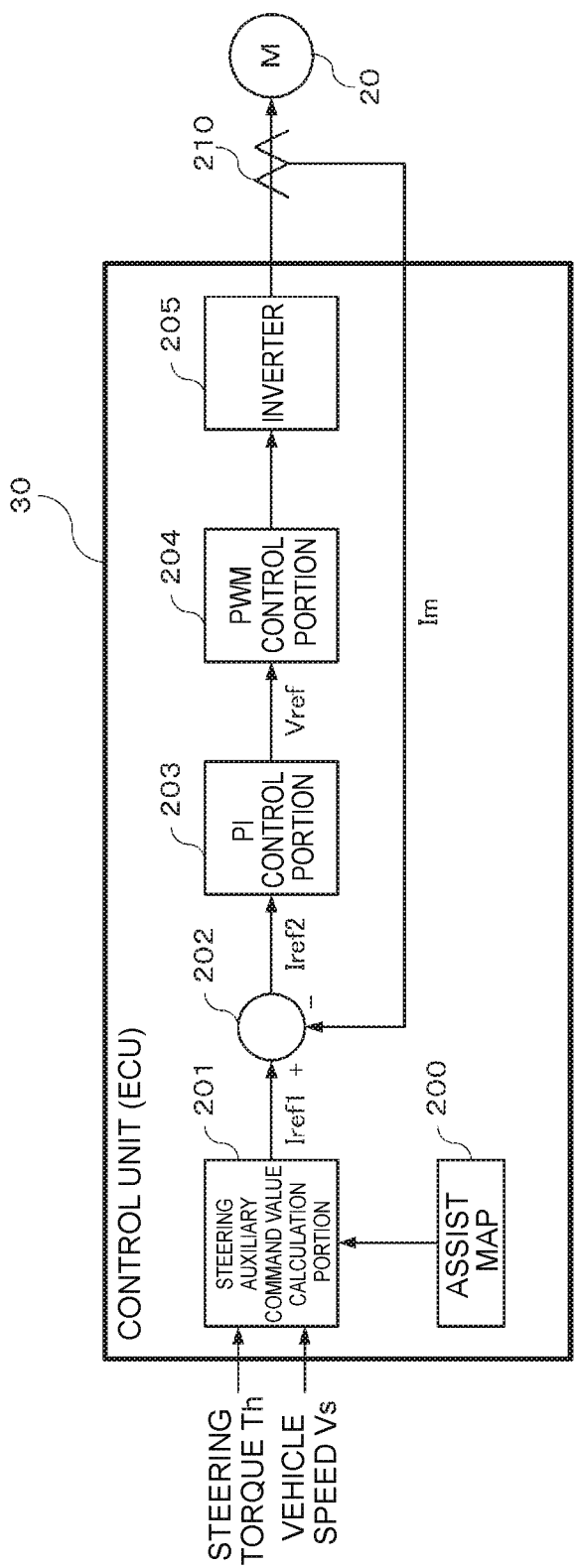
FIG. 2 is a block diagram illustrating one example of functions for controlling a motor 20 by a control unit 30.

FIG. 2 is a block diagram illustrating one example of functions for controlling the motor 20 by the control unit 30. Each function illustrated in FIG. 2 is realized by executing programs stored in a memory by a processor or by using a circuit element, such as a transistor, for example.

As illustrated in FIG. 2, the control unit 30 has an assist map 200, a steering auxiliary command value calculation portion 201, a subtraction portion 202, a PI (Proportional-Integral) control portion 203, a PWM (Pulse Width Modulation) control portion 204, and an inverter 205.

Figure 3:
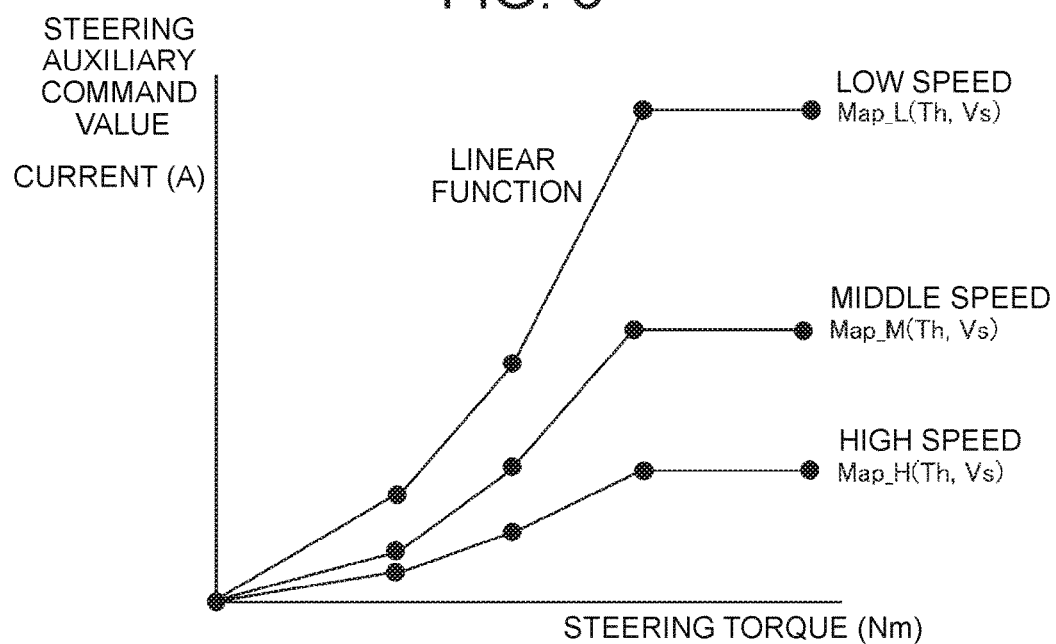
FIG. 3 is a view illustrating an assist map 200A which is one example of an assist map 200.

The assist map 200 is information showing the correspondence relationship between a steering torque and a steering auxiliary command value (current value). FIG. 3 is a view illustrating an assist map 200A which is one example of the assist map 200. As illustrated in FIG. 3, the assist map 200A includes information showing the correspondence relationship between a steering torque and a steering auxiliary command value in each speed region of a low speed, a middle speed, and a high speed, for example. In this embodiment, the information showing the correspondence relationship is represented by the parameters of a plurality of linear functions. The assist map 200 can be updated from the tuning device 100.

The steering auxiliary command value calculation portion 201 calculates a steering auxiliary command value Iref1 which is a control target value of a current to be supplied to the motor 20 using the assist map 200 based on the steering torque Th and the vehicle speed Vs. A description is given with reference to the example illustrated in FIG. 3. For example, when the vehicle speed Vs is a low speed, the steering auxiliary command value calculation portion 201 can calculate the steering auxiliary command value Iref1 by substituting the steering torque Th for a Map_L (function containing a group of a plurality of linear functions) illustrated in FIG. 3. The steering auxiliary command value calculation portion 201 can similarly calculate the steering auxiliary command values Iref1 based on a Map_M and a Map_H illustrated in FIG. 3 also in the case where the vehicle speeds Vs are a middle speed and a high speed. When the vehicle speed Vs is a speed between the two speed regions, the steering auxiliary command value calculation portion 201 can calculate a steering auxiliary command value Iref1 using the functions of the two speed regions. For example, when the vehicle speed Vs is a speed between the low speed and the middle speed, the steering auxiliary command value calculation portion 201 can calculate Map_L (Th)×α+Map_M (Th)×(1−α)=Iref1. α is a value of 0<α<1, for example, and can be set as appropriate according to the vehicle speed Vs.

The steering auxiliary command value Iref1 calculated by the steering auxiliary command value calculation portion 201 is input into the PI control portion 203 for improving the properties through the subtraction portion 202. A voltage control command value Vref whose properties are improved by the PI control portion 203 is input into the PWM control portion 204, so that the motor 20 is PWM-driven through the inverter 205. A current value Im of the motor 20 is detected with the motor current detector 210, and fed back to the subtraction portion 202.

Figure 4:
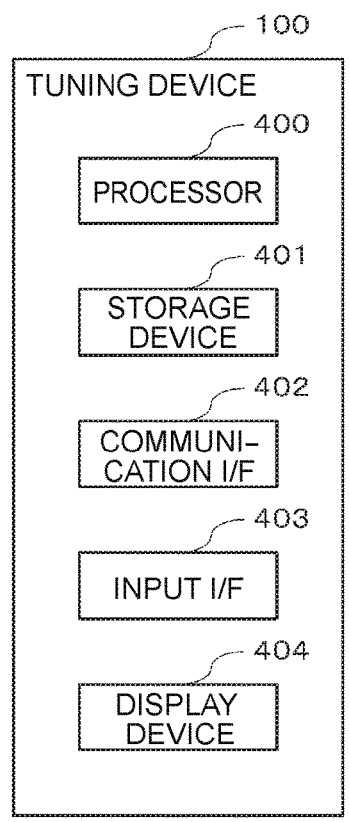
FIG. 4 is a view illustrating one example of the hardware organization of a tuning device 100.

FIG. 4 is a view illustrating one example of the hardware organization of the tuning device 100. The tuning device 100 has a processor 400, a storage device 401, a communication interface (I/F) 402, an input interface (I/F) 403, and a display device 404.

The processor 400 realizes various functions in the tuning device 100 by executing programs stored in the storage device 401.

The storage device 401 is a device for storing programs and data and includes a memory, a hard disk, and the like. The storage device 401 contains a volatile storage area for temporarily storing data and a nonvolatile storage area for permanently storing data.

The communication I/F 402 is an interface for transmitting and receiving data between a device outside the tuning device 100 and the tuning device 100. In this embodiment, the communication I/F 402 is used in order to communicate with the control unit 30 through the CAN 40, for example.

The input I/F 403 is an interface for inputting various data into the tuning device 100. The input I/F 403 contains a keyboard, a mouse, a touch panel, and the like, for example. In this embodiment, the input I/F 403 is used in order for a user to input candidate points (described later) represented by a steering torque and a candidate value of a steering auxiliary command value according to the steering torque.

The display device 404 is a device for displaying various kinds of information. The display device 404 may be provided outside the tuning device 100. The display device 404 may also have a function of the input I/F 403 by a touch panel or the like.

FIG. 5 is a block diagram illustrating functions (first embodiment) realized in the tuning device 100A which is one example of the tuning device 100. The tuning device 100A has a candidate point receiving portion 500, a candidate point storing portion 501, a polynomial calculation portion 502, a polynomial storing portion 503, an adjustment point calculation portion 504, an adjustment point storing portion 505, a linear function calculation portion 506, an adjustment information storing portion 507, and an adjustment information outputting portion 508. Each portion illustrated in FIG. 5 can be realized by using the storage area of the storage device 401 or by executing the programs stored in the storage device 401 by the processor 400, for example.

The candidate point receiving portion 500 receives candidate points represented by a steering torque and a candidate value of the steering auxiliary command value according to the steering torque from a user, and then stores information on the candidate points in the candidate point storing portion 501. FIG. 6 is a view illustrating one example of the candidate points. In FIG. 6, the candidate points are represented by white dots. In the example illustrated in FIG. 6, the candidate point receiving portion 500 receives four candidate points (coordinate values) in a certain speed region. The number of the candidate points which can be received by the candidate point receiving portion 500 can be set to arbitrary numbers of 3 or more. Moreover, the candidate point receiving portion 500 can receive candidate points for each of the plurality of speed regions.

Figure 7:
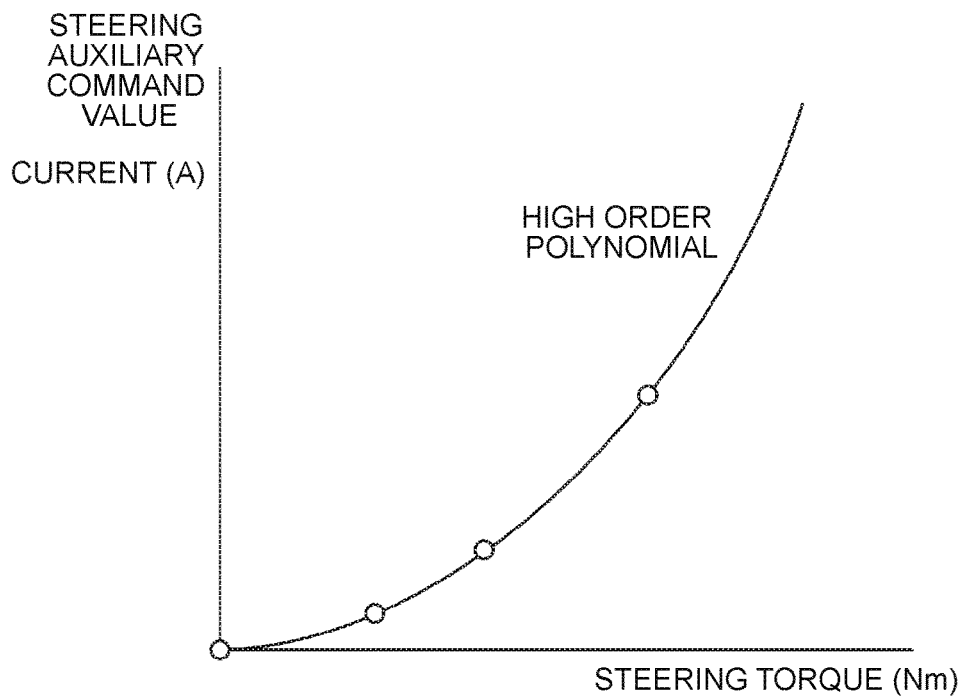
FIG. 7 is a view illustrating one example of a high order polynomial (function) approximating the candidate points.

The polynomial calculation portion 502 calculates a high order polynomial (quadratic or higher) approximating the plurality of candidate points received by the candidate point receiving portion 500 by a least square method or spline interpolation, and then stores information on the calculated high order polynomial (for example, the coefficient of the high order polynomial and the like) in the polynomial storing portion 503. When candidate points are received for each of the plurality of speed regions, a high order polynomial is also calculated for each of the plurality of speed regions. FIG. 7 is a view illustrating one example of the high order polynomial (function) approximating candidate points. As illustrated in FIG. 7, the high order polynomial can be a function passing through the origin point (Steering torque=0, Steering auxiliary Command value=0), for example. In the high order polynomial, the gradient in the origin point can be set to zero, for example.

The adjustment point calculation portion 504 calculates adjustment points represented by a steering torque and a steering auxiliary command value according to the steering torque based on the high order polynomial calculated by the polynomial calculation portion 502, and then stores information on the calculated adjustment points in the adjustment point storing portion 505. When a high order polynomial is calculated for each of the plurality of speed regions, adjustment points are also calculated for each of the plurality of speed regions.

Figure 8A:
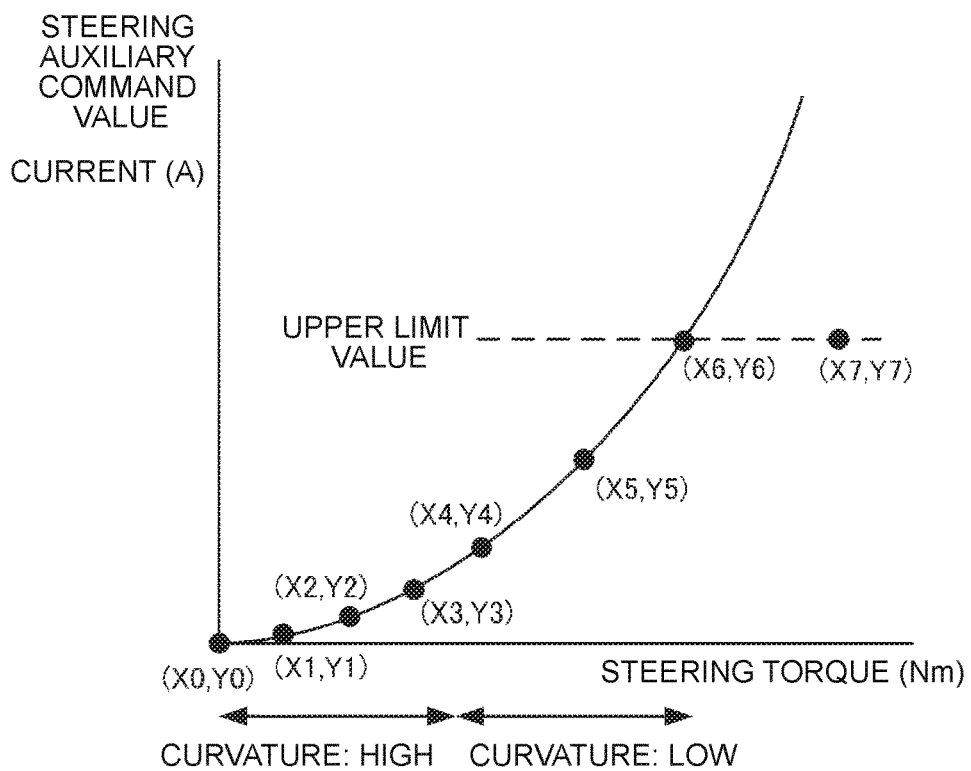
FIG. 8A is a view illustrating an example of adjustment points.
Figure 8B:
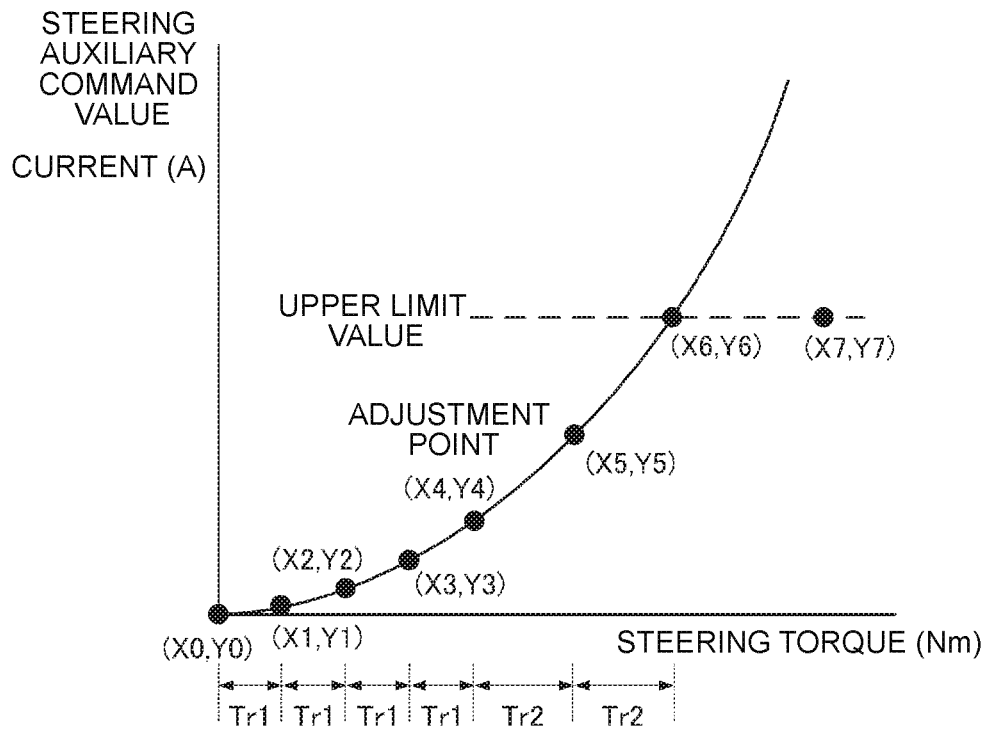
FIG. 8B is a view illustrating an example of adjustment points.

FIG. 8A and FIG. 8B are views illustrating examples of the adjustment points. In FIG. 8A and FIG. 8B, the adjustment points are represented by black dots. In the examples illustrated in FIG. 8A and FIG. 8B, the adjustment point calculation portion 504 calculates seven adjustment points (coordinate values). More specifically, the adjustment point calculation portion 504 calculates steering auxiliary command values Y0 to Y7 based on the high order polynomial for each of specific steering torque values X0 to X7. As illustrated in FIG. 8A and FIG. 8B, the upper limit value can be set to the steering auxiliary command value for each speed region. Then, the adjustment point calculation portion 504 can set the intersection ((X6, Y6) in the examples of FIG. 8A and FIG. 8B) between the high order polynomial and the upper limit value (Y=straight line of the upper limit value) as one of the adjustment points. Moreover, the adjustment point calculation portion 504 can set a point ((X7, Y7) in the examples of FIG. 8A and FIG. 8B) where the steering torque is higher than that at the intersection and the steering auxiliary command value is the upper limit value as the adjustment point. The number of the adjustment points calculated by the adjustment point calculation portion 504 can be set to arbitrary numbers larger than the number of the candidate points.

The adjustment point calculation portion 504 can calculate the adjustment points so that the number of the adjustment points in a section where the curvature is relatively high in the high order polynomial is relatively large. For example, in the example illustrated in FIG. 8A, four adjustment points are calculated in a section (second section) where the curvature is relatively high (steering torque is relatively low) and three adjustment points are calculated in a section (first section) where the curvature is relatively low (steering torque is relatively high).

Moreover, the adjustment point calculation portion 504 can calculate a plurality of adjustment points so that a difference in the steering torque between the adjustment points decreases with an increase in the curvature of the high order polynomial. For example, in the example illustrated in FIG. 8B, while a difference in the steering torque between adjustment points is a relatively large Tr2 in the section where the curvature is relatively low, the difference in the steering torque between adjustment points is a relatively small Tr1 in the section where the curvature is relatively high. The curvature of the high order polynomial can be calculated by second order differentiation, for example. The differentiation may be calculated by a difference between two points close to each other.

The adjustment point calculation portion 504 can calculate a plurality of adjustment points so that the number of the adjustment points in the section where the curvature is relatively high in the high order polynomial is relatively large and so that a difference in the steering torque between the adjustment points decreases with an increase in the curvature of the high order polynomial.

Figure 9:
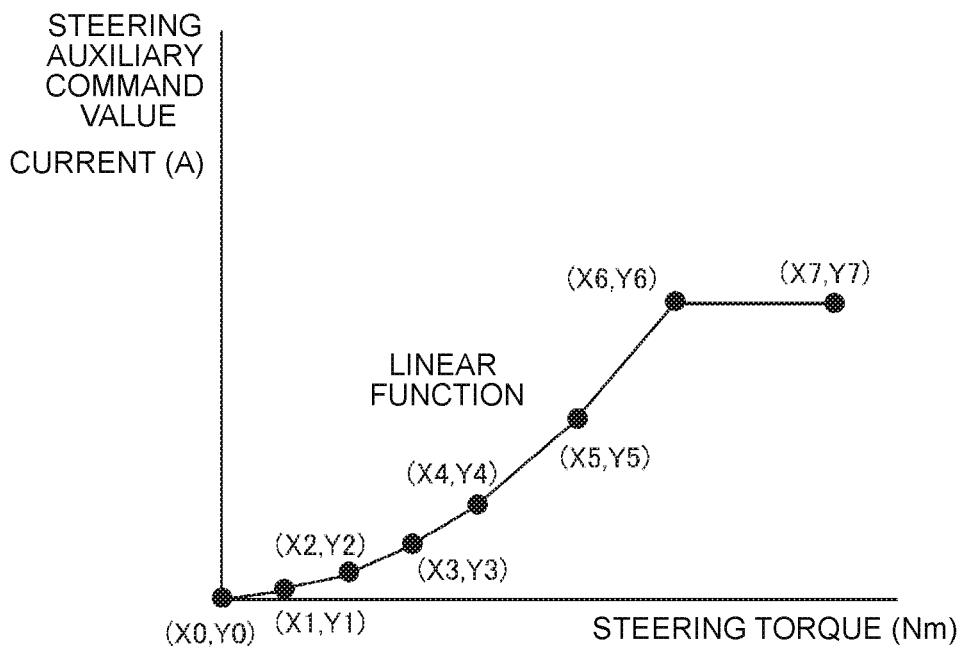
FIG. 9 is a view illustrating a plurality of linear functions connecting two adjacent points for the plurality of adjustment points illustrated in FIG. 8.

The linear function calculation portion 506 calculates a plurality of linear functions connecting two adjacent points in the adjustment points calculated by the adjustment point calculation portion 504, and then stores information on the calculated linear function (for example, the coefficient of the linear function and the like) in the adjustment information storing portion 507 as adjustment information for adjusting the assist map 200. When the adjustment points are calculated for each of the plurality of speed regions, a linear function is also calculated for each of the plurality of speed regions. FIG. 9 is a view illustrating a plurality of linear functions connecting two adjacent points for the plurality of adjustment points illustrated in FIG. 8.

The adjustment information outputting portion 508 outputs the information on the linear function calculated by the linear function calculation portion 506 in order to adjust the assist map 200 (correspondence relationship between the steering torque and the steering auxiliary command value). The adjustment information outputting portion 508 adjusts the assist map 200 by writing the adjustment information in the control unit 30 through the CAN40, for example.

Figure 10:
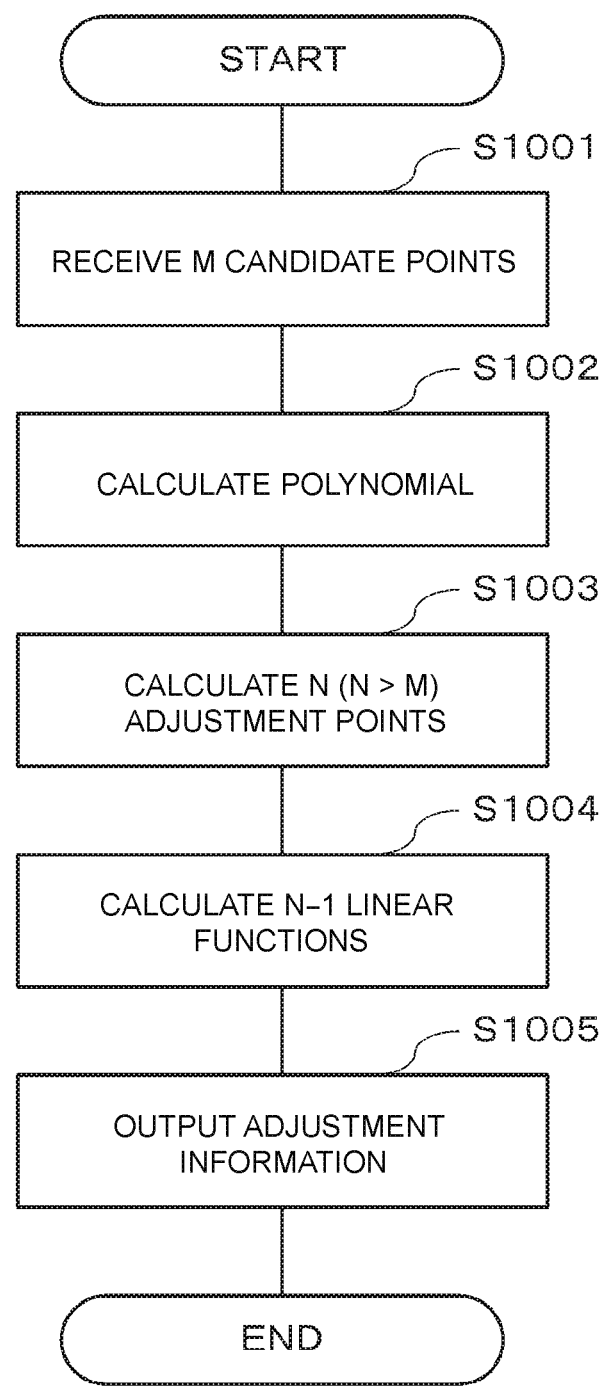
FIG. 10 is a flow chart illustrating one example of processing in the tuning device 100A.

FIG. 10 is a flow chart illustrating one example of processing in the tuning device 100A. First, the candidate point receiving portion 500 receives M candidate points represented by a steering torque and a candidate value of a steering auxiliary command value according to the steering torque from a user (S1001). The polynomial calculation portion 502 calculates a high order polynomial approximating the M candidate points (S1002). The adjustment point calculation portion 504 calculates N adjustment points (N>M) represented by a steering torque and a steering auxiliary command value according to the steering torque based on the calculated high order polynomial (S1003). The linear function calculation portion 506 calculates N−1 linear functions connecting two adjacent points in the N adjustment points (S1004). Then the adjustment information outputting portion 508 outputs information on the N−1 linear functions in order to adjust the correspondence relationship in the assist map 200 (S1005). As described above, the tuning device 100A can execute the processing illustrated in FIG. 10 in each of the plurality of speed regions. In this case, the output of the adjustment information may be performed for each speed region or may be collectively performed for the plurality of speed regions.

Figure 18:
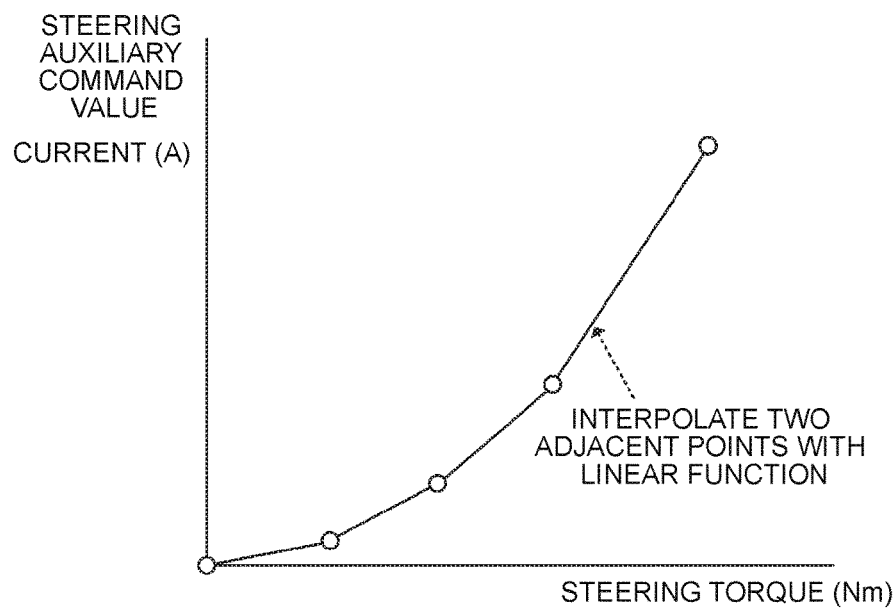
FIG. 18 is a view illustrating one example of a tuning technique of an assist map.
Figure 19:
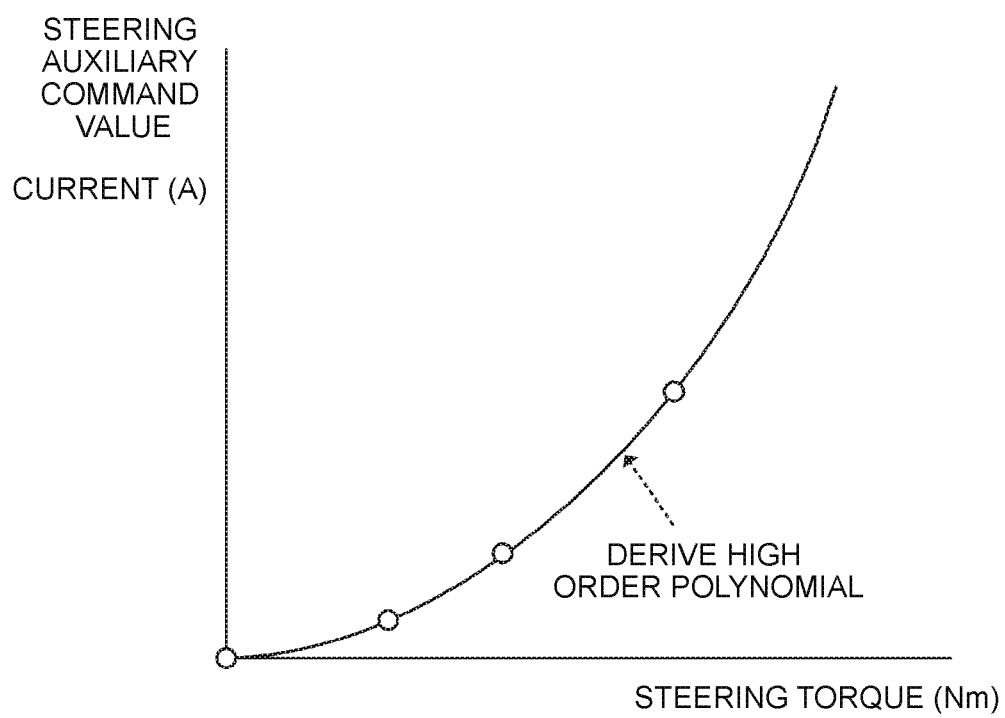
FIG. 19 is a view illustrating another example of a tuning technique of an assist map.

The first embodiment of the present invention is described above. In the tuning device 100A, the relatively small number of M candidate points are received from a user, the high order polynomial approximating the M candidate points is calculated by a least square method or spline interpolation, and then the relatively large number of N adjustment points (N>M) are calculated based on the calculated high order polynomial. Then, in the tuning device 100A, the N−1 linear functions connecting two adjacent points in the N adjustment points are calculated, and then the information on the N−1 linear function is written in the assist map 200. Therefore, the work cost of the tuning can be reduced as compared with a case where a relatively large number of points are manually determined as illustrated in FIG. 18. The information referred to in the calculation of the steering auxiliary command value is information on the linear function, and therefore the arithmetic processing time of the steering auxiliary command value can be reduced as compared with a case where the information on a high order polynomial is referred to as it is as illustrated in FIG. 19.

Moreover, in the tuning device 100A, the number of the adjustment points in the region where the curvature of the high order polynomial is relatively high can be set to be larger than the number of the adjustment points in the region where the curvature of the high order polynomial is relatively low as illustrated in FIG. 8. Thus, as illustrated in FIG. 9, the changes in the steering auxiliary command value in performing the interpolation by the linear function can be smoothened and the steering feel can be improved.

Moreover, in the tuning device 100A, the high order polynomial is calculated by a least square method or spline interpolation, whereby the changes in the steering auxiliary command value particularly in the region where the steering torque is low are reduced and the steering feel can be improved as illustrated in FIG. 8.

Second Embodiment

Next, a second embodiment of the present invention is described. Configurations equivalent to those of the first embodiment are designated by the equivalent reference numerals and a detailed description thereof is omitted.

Figure 11:
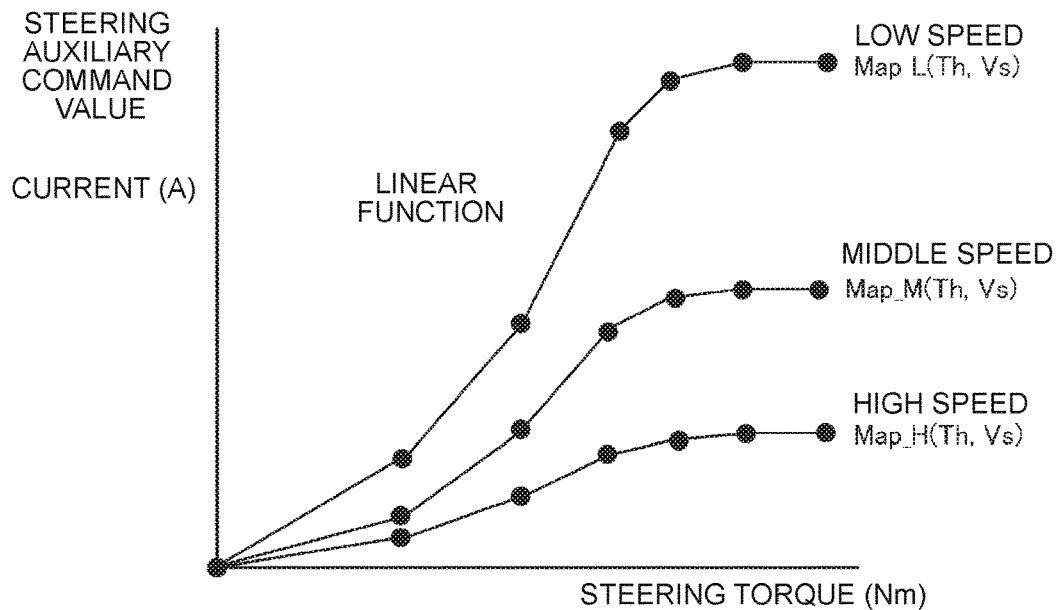
FIG. 11 is a view illustrating an assist map 200B which is one example of the assist map 200.

FIG. 11 is a view illustrating an assist map 200B which is one example of the assist map 200. The assist map 200B is different from the assist map 200A illustrated in FIG. 3 in that the changes in steering auxiliary command values near the upper limit value are smoother than those of the assist map 200A.

Figure 12:
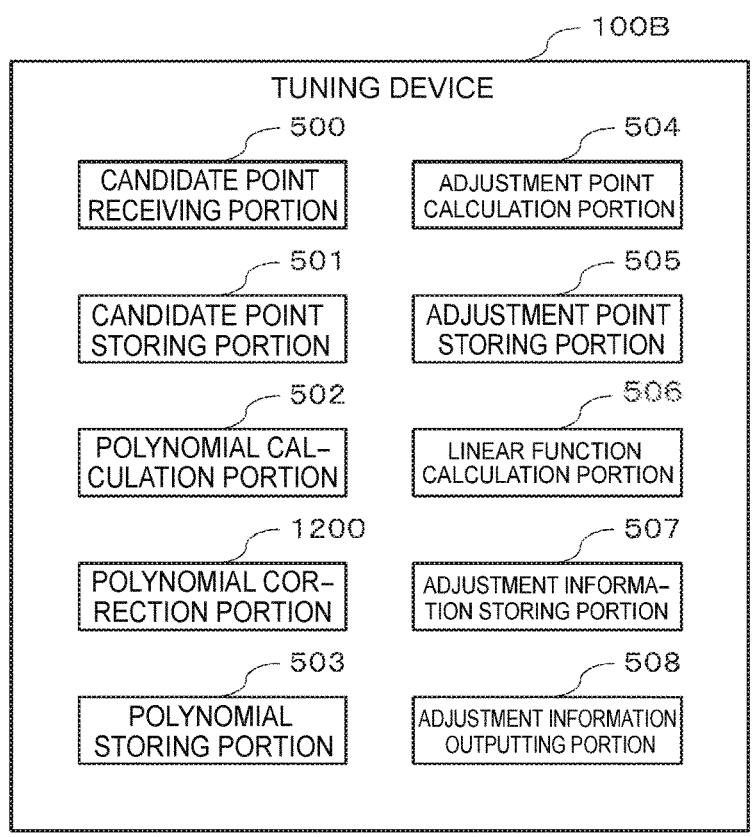
FIG. 12 is a block diagram illustrating functions realized in a tuning device 100B (second embodiment) which is one example of the tuning device 100.

FIG. 12 is a block diagram illustrating functions realized in a tuning device 100B (second embodiment) which is one example of the tuning device 100. The tuning device 100B further has a polynomial correction portion 1200 in addition to the configurations provided in the tuning device 100A illustrated in FIG. 5.

The polynomial correction portion 1200 limits the steering auxiliary command value by a predetermined upper limit value and corrects a high order polynomial so that the rate of changes in a steering auxiliary command value to a steering torque gradually decreases near the predetermined upper limit value to calculate a corrected high order polynomial. Then, the polynomial correction portion 1200 stores information on the calculated corrected high order polynomial (for example, coefficient of the corrected high order polynomial and the like) in the polynomial storing portion 503.

Figure 13A:
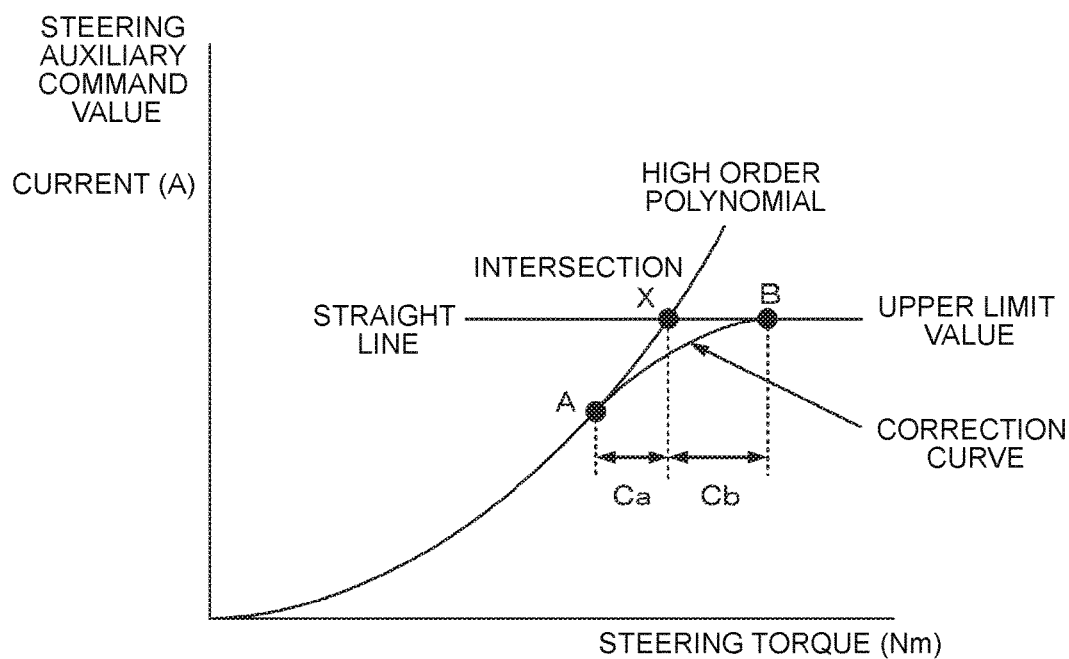
FIG. 13A is a view illustrating one example of correction of a high order polynomial.

FIG. 13A is a view illustrating one example of the correction of a high order polynomial. As illustrated in FIG. 13A, the polynomial correction portion 1200 determines an intersection X between the high order polynomial and the straight line of the upper limit value. Then, the polynomial correction portion 1200 determines a point A of the high order polynomial in a region where the steering torque is lower than that at the intersection X and a point B of the straight line in a region where the steering torque is higher than that at the intersection X. As illustrated in FIG. 13A, the steering torque at the point A is lower by only Ca than the steering torque at the intersection X and the steering torque at the point B is higher by only Cb than the steering torque at the intersection X. The Ca and Cb values may be determined beforehand or may be dynamically calculated based on the inclination of the high order polynomial at the intersection X or the like, for example. When the points A and B are determined, the polynomial correction portion 1200 calculates a correction curve (for example, cubic curve) between the point A and the point B so that the rate of changes (inclination) in the steering auxiliary command value to the steering torque gradually decrease toward the point B from the point A. The polynomial correction portion 1200 can calculate the correction curve so that the inclination of the high order polynomial and the inclination of the correction curve are equal to each other at the point A. Moreover, the polynomial correction portion 503 can calculate the correction curve so that the inclination at the point B is zero.

Figure 13B:
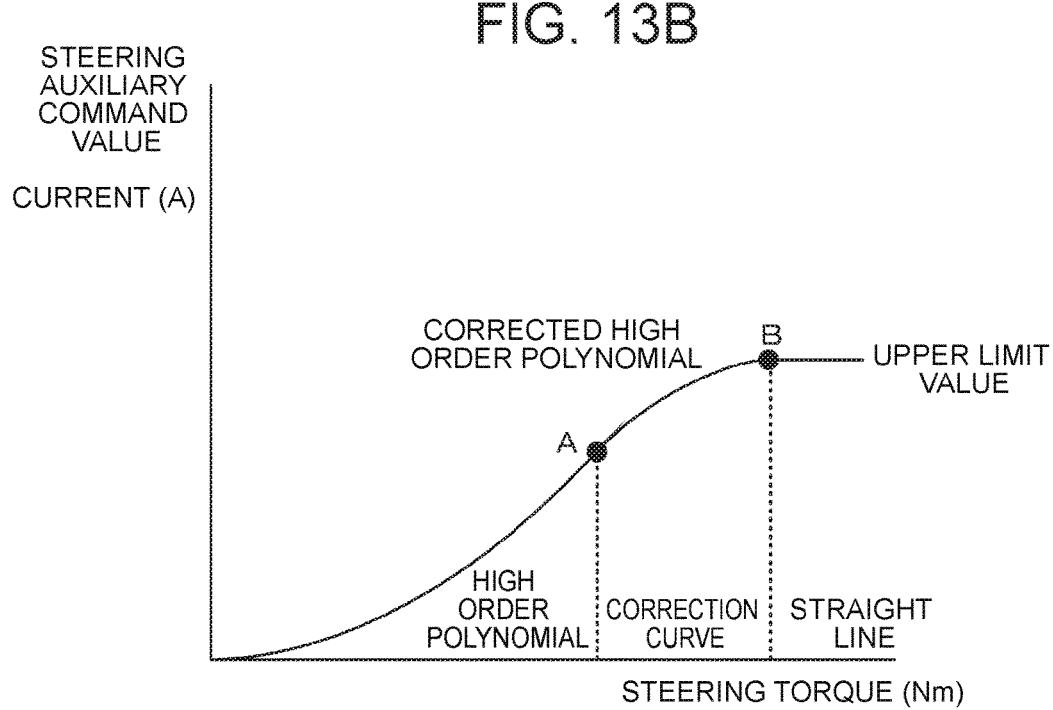
FIG. 13B is a view illustrating one example of a corrected high order polynomial.

FIG. 13B is a view illustrating one example of the corrected high order polynomial. As illustrated in FIG. 13B, the corrected high order polynomial contains a high order polynomial in a region where the steering torque is lower than that at the point A, the correction curve in a region where the steering torque is a torque between the point A and the point B, and the straight line of the upper limit value in a region where the steering torque is higher than that at the point B.

The adjustment point calculation portion 504 calculates adjustment points represented by a steering torque and a steering auxiliary command value according to the steering torque based on the corrected high order polynomial calculated by the polynomial correction portion 1200, and then stores information on the calculated adjustment points in the adjustment point storing portion 505. When a high order polynomial is calculated for each of the plurality of speed regions, the adjustment point is also calculated for each of the plurality of speed regions.

Figure 14:
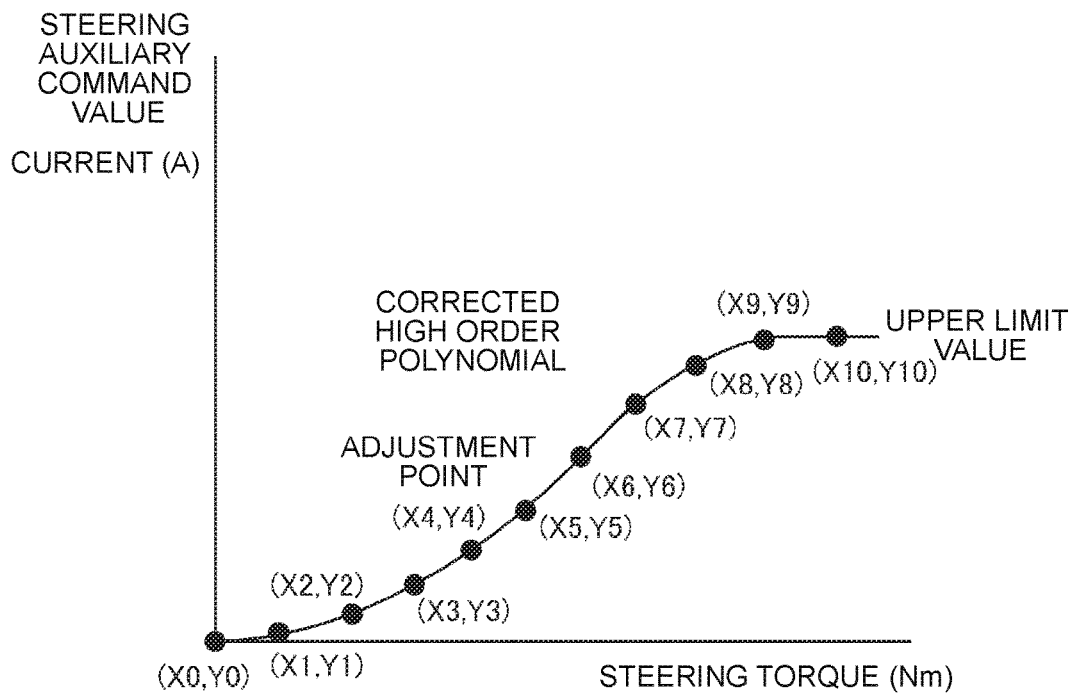
FIG. 14 is a view illustrating one example of adjustment points.
Figure 15:
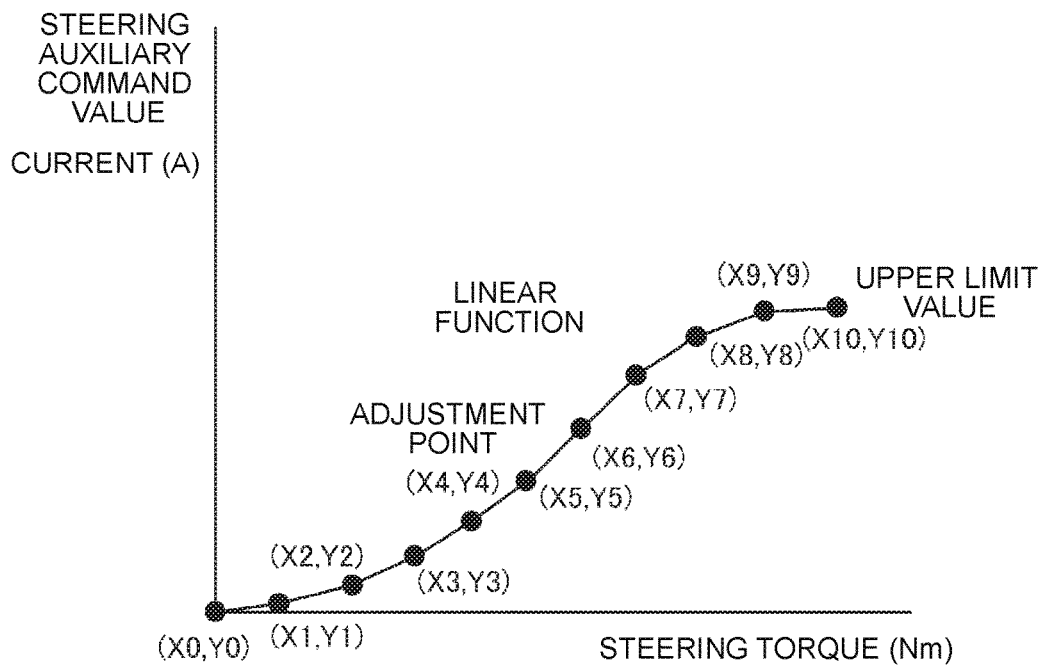
FIG. 15 is a view illustrating a plurality of linear functions connecting two adjacent points for the plurality of adjustment points illustrated in FIG. 14.

FIG. 14 is a view illustrating one example of the adjustment points. In FIG. 14, the adjustment points are represented by black dots. In the example illustrated in FIG. 14, the adjustment point calculation portion 504 calculates 11 adjustment points (coordinate values). More specifically, the adjustment point calculation portion 504 calculates steering auxiliary command values Y0 to Y10 based on the corrected high order polynomial for each of specific steering torque values X0 to X10. The number of the adjustment points calculated by the adjustment point calculation portion 504 can be set to arbitrary numbers larger than the number of candidate points. FIG. 15 is a view illustrating a plurality of linear functions connecting two adjacent points for a plurality of adjustment points illustrated in FIG. 14.

Moreover, the adjustment point calculation portion 504 can calculate the adjustment points so that the number of the adjustment points in the section where the curvature is relatively high in the corrected high order polynomial is relatively large and/or so that a difference in the steering torque between the adjustment points decreases with an increase in the curvature of the high order polynomial as with the examples illustrated in FIG. 8A and FIG. 8B.

Figure 16:
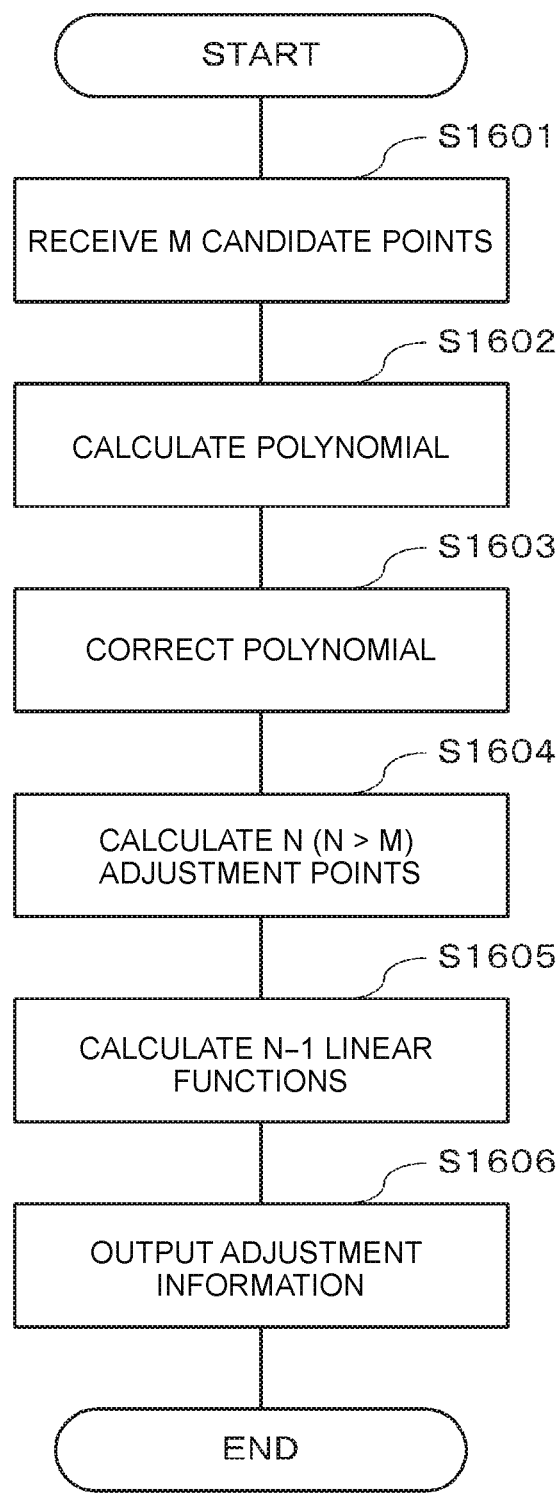
FIG. 16 is a flow chart illustrating one example of processing in the tuning device 100B.

FIG. 16 is a flow chart illustrating one example of processing in the tuning device 100B. First, the candidate point receiving portion 500 receives M candidate points represented by a steering torque and a candidate value of a steering auxiliary command value according to the steering torque from a user (S1601). The polynomial calculation portion 502 calculates a high order polynomial approximating the M candidate points by a least square method (S1602). The polynomial correction portion 1200 limits the steering auxiliary command value by a predetermined upper limit value and corrects a high order polynomial so that the rate of changes in a steering auxiliary command value to a steering torque gradually decreases near the predetermined upper limit value to calculate a corrected high order polynomial (S1603). The adjustment point calculation portion 504 calculates N adjustment points (N>M) represented by a steering torque and a steering auxiliary command value according to the steering torque based on the calculated high order polynomial (S1604). The linear function calculation portion 506 calculates N−1 linear function connecting two adjacent points in the N adjustment points (S1605). Then the adjustment information outputting portion 508 outputs information on the N−1 linear functions in order to adjust the correspondence relationship in the assist map 200 (S1606). As described above, the tuning device 100 can execute the processing illustrated in FIG. 16 in each of the plurality of speed regions. In this case, the output of the adjustment information may be performed for each speed region or may be collectively performed for the plurality of speed regions.

Simulation results for verifying the effects by the correction of the high order polynomial are described with reference to FIG. 17A to FIG. 17C.

Figure 17A:
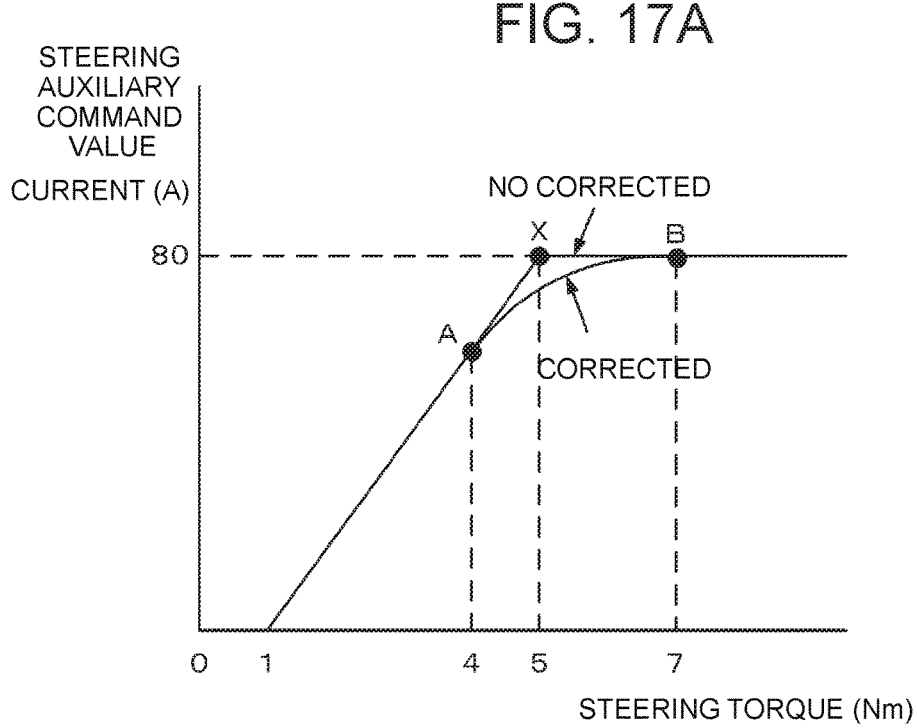
FIG. 17A is a view illustrating an assist map used in a simulation.

FIG. 17A is a view illustrating the assist map used in the simulation. As illustrated in FIG. 17A, in the simulation, a straight line having an inclination of 20 (A/Nm) is used instead of a high order polynomial. The upper limit value of a steering auxiliary command value is 80 (A), the steering torque at the intersection X between the straight line having an inclination of 20 and the straight line of the upper limit value is 5 (Nm), the coordinates at the point A in the region where the steering torque is lower than that at the intersection X are (4 (N m), 60 (A)), the coordinates at the point B in the region where the steering torque is higher than that at the intersection X are (7 (Nm), 80 (A)), and the correction curve between the point A and the point B is a cubic curve.

Figure 17B:
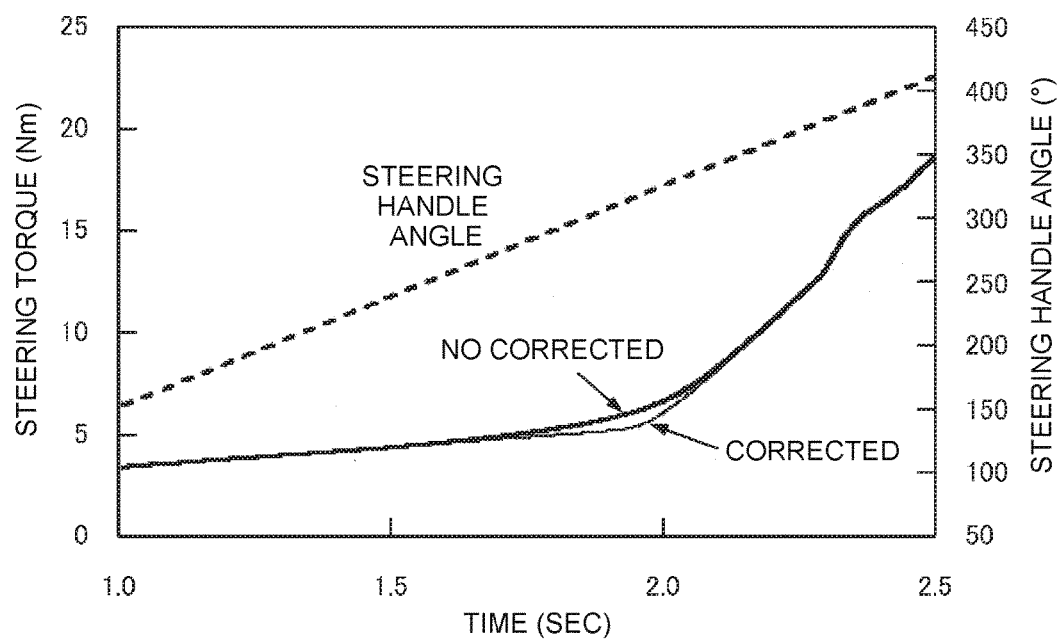
FIG. 17B is a simulation result of changes in a steering torque accompanying changes in a steering wheel angle in which the horizontal axis represents the time.
Figure 17C:
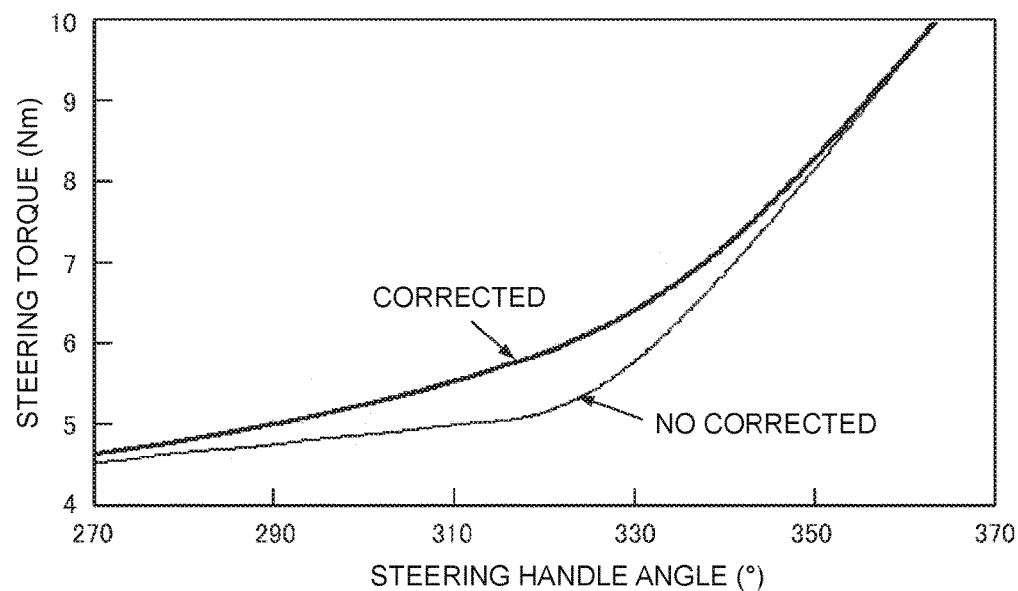
FIG. 17C is the simulation result of changes in a steering torque accompanying changes in a steering wheel angle in which the horizontal axis represents the steering wheel angle.

FIG. 17B is the simulation results of the changes in the steering torque accompanying changes in the steering wheel angle in which the horizontal axis represents the time. FIG. 17C is the simulation results of the changes in the steering torque accompanying the changes in the steering wheel angle in which the horizontal axis represents the steering wheel angle. This simulation detects changes in the steering torque when the steering handle angle is changed as illustrated by the dashed line in FIG. 17B. As illustrated in FIG. 17B and FIG. 17C, the steering torque sharply changes around the steering handle angle of 320° in the case where no correction is performed. On the other hand, the steering torque moderately changes around the steering handle angle of 320° in the case where correction is performed as compared with the case where no correction is performed. It is clarified from the simulation results that, by correcting a high order polynomial so that the rate of changes in the steering auxiliary command value to the steering torque gradually decreases near the upper limit value of the steering auxiliary command value, the changes in the steering torque accompanying the changes in the steering handle angle can be reduced.

The second embodiment of the present invention is described above. In the tuning device 100B, the relatively small number of M candidate points are received from a user, and then the high order polynomial approximating the M candidate points is calculated by a least square method or spline interpolation. Furthermore, the corrected high order polynomial is calculated so that the rate of changes in the steering auxiliary command value to the steering torque gradually decreases near the upper limit value of the steering auxiliary command value. Then, the relatively large number of N adjustment points (N>M) are calculated based on the calculated corrected high order polynomial. Then, in the tuning device 100B, the N−1 linear functions connecting two adjacent points in the N adjustment points are calculated, and then information on the N−1 linear function is written in the assist map 200.

Thus, the work cost of the tuning can be reduced as compared with a case where a relatively large number of points are manually determined as illustrated in FIG. 18. The information referred to in the calculation of the steering auxiliary command value is information on the linear function, and therefore the arithmetic processing time of the steering auxiliary command value can be reduced as compared with a case where the information on a high order polynomial is referred to as it is as illustrated in FIG. 19. Moreover, in the tuning device 100B, a linear function is calculated based on the corrected high order polynomial, and therefore sharp changes in the rate of changes (inclination) of the steering auxiliary command value before and after the intersection between the linear function or the high order polynomial and the upper limit value of the steering auxiliary command value are prevented, so that the steering feel can be improved.

This embodiment facilitates the understanding of the present invention and does not limit the present invention in the interpretation. The present invention can be altered/improved without deviating from the scope thereof and also include equivalents thereof.

REFERENCE SIGNS LIST

1 Steering handle
2 Column shaft
3 Speed reduction gear
4a, 4b Universal joint
5 Rack and pinion mechanism
6a, 6b Tie rod
7a, 7b Hub unit
8L, 8R Steering wheel
10 Torque sensor
11 Ignition key
13 Battery
14 Steering angle sensor
20 Moto
30 Control unit (ECU)
40 CAN
41 Non-CAN
100 Tuning device
200 Assist map
201 Steering auxiliary command value calculation portion
202 Subtraction portion
203 PI control portion
204 PWM control portion
205 Inverter
210 Motor current detector
400 Processor
401 Storage device
402 Communication interface
403 Input interface
404 Display device
500 Candidate point receiving portion
501 Candidate point storing portion
502 Polynomial calculation portion
503 Polynomial storing portion
504 Adjustment point calculation portion
505 Adjustment point storing portion
506 Linear function calculation portion
507 Adjustment information storing portion
508 Adjustment information outputting portion
1200 Polynomial correction portion

What is claimed is:

1. A tuning device of an electric power steering apparatus assisting steering based on a correspondence relationship between a steering torque and a steering auxiliary command value according to the steering torque, the tuning device comprising a processor configured to realize:
    a candidate point receiving portion receiving a plurality of candidate points represented by the steering torque and a candidate value of the steering auxiliary command value according to the steering torque;
    a polynomial calculation portion calculating a high order polynomial approximating the plurality of candidate points;
    an adjustment point calculation portion calculating a plurality of adjustment points, a number of which is larger than the plurality of candidate points and which are represented by the steering torque and the steering auxiliary command value according to the steering torque, based on the high order polynomial;
    a linear function calculation portion calculating a plurality of linear functions connecting two adjacent points in the plurality of adjustment points; and
    an adjustment information outputting portion outputting information on the plurality of linear functions in order to adjust the correspondence relationship.

2. The tuning device according to claim 1, wherein the polynomial calculation portion calculates the high order polynomial by a least square method or spline interpolation.

3. The tuning device according to claim 1, wherein the adjustment point calculation portion
    calculates a first number of the adjustment points from a first section having a first curvature in the high order polynomial, and
    calculates a second number of the adjustment points, a number of which is larger than the first number, from a second section having a second curvature higher than the first curvature in the high order polynomial.

4. The tuning device according to claim 1, wherein the adjustment point calculation portion calculates the adjustment points so that a difference in the steering torque between the adjustment points decreases with an increase in the curvature of the high order polynomial.

5. The tuning device according to claim 1,
wherein the processor is further configured to realize a polynomial correction portion limiting the steering auxiliary command value by a predetermined upper limit value and correcting the high order polynomial so that rate of changes in the steering auxiliary command value to the steering torque gradually decreases near the predetermined upper limit value to calculate a corrected high order polynomial, and
wherein the adjustment point calculation portion calculates the adjustment points based on the corrected high order polynomial.

6. The tuning device according to claim 5, wherein
the polynomial correction portion calculates the corrected high order polynomial so that the rate of changes in the steering auxiliary command value to the steering torque gradually decreases from a point of the high order polynomial in a region where the steering torque is lower than a steering torque at an intersection between the high order polynomial and a straight line of the predetermined upper limit value toward a point of the straight line in a region where the steering torque is higher than the steering torque at the intersection.

7. The tuning device according to claim 6, wherein
the polynomial correction portion calculates the corrected high order polynomial so that the rate of changes in the steering auxiliary command value to the steering torque gradually decreases based on an inclination of the high order polynomial at the point of the high order polynomial in the region where the steering torque is lower than the steering torque at the intersection.

8. A tuning method of an electric power steering apparatus assisting steering based on a correspondence relationship between a steering torque and a steering auxiliary command value according to the steering torque, wherein the tuning method comprising:
receiving a plurality of candidate points represented by the steering torque and a candidate value of the steering auxiliary command value according to the steering torque;
calculating a high order polynomial approximating the plurality of candidate points;
calculating a plurality of adjustment points, a number of which is larger than the plurality of candidate points and which are represented by the steering torque and the steering auxiliary command value according to the steering torque, based on the high order polynomial;
calculating a plurality of linear functions connecting two adjacent points in the plurality of adjustment points; and
outputting information on the plurality of linear functions in order to adjust the correspondence relationship.

9. A non-transitory computer readable medium storing a program in order for a tuning device of an electric power steering apparatus assisting steering based on a correspondence relationship between a steering torque and a steering auxiliary command value according to the steering torque to realize, via a processor configured to execute the program,
a candidate point receiving portion receiving a plurality of candidate points represented by the steering torque and a candidate value of the steering auxiliary command value according to the steering torque;
a polynomial calculation portion calculating a high order polynomial approximating the plurality of candidate points;
an adjustment point calculation portion calculating a plurality of adjustment points, a number of which is larger than the plurality of candidate points and which are represented by the steering torque and the steering auxiliary command value according to the steering torque, based on the high order polynomial;
a linear function calculation portion calculating a plurality of linear functions connecting two adjacent points in the plurality of adjustment points; and
an adjustment information outputting portion outputting information on the plurality of linear functions in order to adjust the correspondence relationship.

* * * * *